(12) United States Patent
Senior

(10) Patent No.: US 10,721,669 B2
(45) Date of Patent: Jul. 21, 2020

(54) APPARATUS AND METHOD FOR IMPROVING CONNECTIVITY FOR ITEMS OF USER EQUIPMENT IN A WIRELESS NETWORK

(71) Applicant: Airspan Networks Inc., Boca Raton, FL (US)

(72) Inventor: Paul Nicholas Senior, Bicester (GB)

(73) Assignee: AIRSPAN NETWORKS, INC., Boca Raton, FL (US)

(*) Notice: Subject to any disclaimer, the term of this patent is extended or adjusted under 35 U.S.C. 154(b) by 148 days.

(21) Appl. No.: 15/499,027

(22) Filed: Apr. 27, 2017

(65) Prior Publication Data

US 2018/0317153 A1    Nov. 1, 2018

(51) Int. Cl.
*H04W 40/02*   (2009.01)
*H04B 7/0491*  (2017.01)
(Continued)

(52) U.S. Cl.
CPC .......... *H04W 40/02* (2013.01); *H04B 7/0491* (2013.01); *H04B 7/0617* (2013.01);
(Continued)

(58) Field of Classification Search
None
See application file for complete search history.

(56) References Cited

U.S. PATENT DOCUMENTS 10,009,776 B1 *  6/2018  Allen .................... H04W 16/26
2006/0084379 A1   4/2006  O'Neill
(Continued)

FOREIGN PATENT DOCUMENTS

| WO | 2014113749 A1 | 7/2014 |
|---|---|---|
| WO | 2014124666 A1 | 8/2014 |
| WO | 2016028969 A1 | 2/2016 |
| WO | 2016062074 A1 | 4/2016 |
| WO | 2017136503 A1 | 8/2017 |

OTHER PUBLICATIONS

Draytek, "Vigor 2862L Series 3G/4G LTE and VDSL Professional Router," Oct. 29, 2015, [online], available from: https://www.draytek.co.uk/products/business/vigor-2862l, accessed Nov. 9, 2018 (see GB Search Report), 22 pages.
(Continued)

*Primary Examiner* — Adnan Baig
(74) *Attorney, Agent, or Firm* — Haynes Beffel & Wolfeld LLP

(57) ABSTRACT

An apparatus and method are provided for improving connectivity for items of user equipment in a wireless network. The apparatus has a first antenna system for providing a first sector of a network, and a second antenna system for providing a second sector of the network. Further, the apparatus has a third antenna system for communicating with a base station of the network to provide a common wireless backhaul link for the first sector and the second sector. In addition, an interface is provided to an internet connection of a building in which the apparatus is deployed, and backhaul management circuitry is then arranged, in at least one mode of operation, to control utilisation of both the internet connection and the common wireless backhaul link to provide backhaul connectivity to the network for items of user equipment connected to the apparatus via the first and second antenna systems. Through the use of such an apparatus, it has been found that significant improvements in network coverage can be readily obtained, and further the overall spectral efficiency of the network can be enhanced to improve network capacity, with the backhaul management circuitry maintaining an efficient backhaul connection through the combined use of the common wireless backhaul link and the internet connection.

15 Claims, 9 Drawing Sheets

(51) Int. Cl.
  *H04W 28/08*    (2009.01)
  *H04B 7/06*     (2006.01)
  *H04B 7/155*    (2006.01)
  *H04L 12/709*   (2013.01)
  *H04W 88/08*    (2009.01)
  *H04W 88/10*    (2009.01)

(52) U.S. Cl.
  CPC ....... *H04B 7/15514* (2013.01); *H04L 45/245* (2013.01); *H04W 28/08* (2013.01); *H04W 88/085* (2013.01); *H04W 88/10* (2013.01)

(56) References Cited

U.S. PATENT DOCUMENTS

| | | |
|---|---|---|
| 2009/0213730 A1 | 8/2009 | Zeng et al. |
| 2010/0296439 A1 | 11/2010 | Leung et al. |
| 2011/0237255 A1 | 9/2011 | Furukawa |
| 2014/0092803 A1* | 4/2014 | Picker ................ H04W 84/005 370/315 |
| 2015/0215854 A1 | 7/2015 | Ling |
| 2015/0304960 A1 | 10/2015 | Yang et al. |
| 2015/0365959 A1* | 12/2015 | Coldrey ................ H04W 24/04 370/252 |
| 2015/0373672 A1* | 12/2015 | Forssell ................ H04L 47/76 370/329 |
| 2016/0104942 A1 | 4/2016 | Pera et al. |
| 2016/0149635 A1 | 5/2016 | Hinman et al. |
| 2016/0262161 A1 | 9/2016 | Li et al. |
| 2016/0269969 A1 | 9/2016 | Braithwaite |
| 2016/0381585 A1 | 12/2016 | Dudzinski et al. |
| 2017/0142595 A1 | 5/2017 | Ljung et al. |
| 2017/0215210 A1 | 7/2017 | Lipowski et al. |
| 2017/0230086 A1 | 8/2017 | Chen et al. |

OTHER PUBLICATIONS

GB Search Report from GB1804897.5, dated Sep. 24, 2018, 6 pages.

IEEE, "High-Capacity Ethernet Backhaul Radio Systems for Advanced Mobile Data Networks," Aug. 2009, IEEE Microwave Magazine, [online], available from: https://ieeexplore.ieee.org/stamp/stamp.jsp?arnumber=5185531, accessed Nov. 9, 2018, 6 pages, (see GB Search Report).

Reddit, "how does mesh work with thernet backhaul," Feb. 3, 2017, reddit.com, [online], available from: https://www.reddit.com/r/eero/comments/5x3p0w/how_does_mesh_work_with_ethernet_backhaul, accessed Nov. 9, 2018, 4 pages (see GB Search Report).

Smallnetbuilder, "eero Home Wi-Fi System Reviewed," 16/03/206, smallnetbuilder.com, [online], available from: https://www.smallnetbuilder.com/wireless/wireless-reviews/32962-eero-home-wi-fi-system-reviewed?limitstart=0, accessed Nov. 9, 2018, 32 pages (see GB Search Report).

PCT Search Report and Written Opinion from PCT/GB2018/050799, dated Jun. 25, 2018, 15 pages.

3GPP TR 36.806 V9.0.0 (Mar. 2010) 3rd Generation Partnership Project; Technical Specification Group Radio Access Network; Evolved Universal Terrestrial Radio Access (E-UTRA); Relay architectures for E-UTRA (LTE-Advanced) (Release 9), Mar. 2010, 34 pages.

3GPP TR 36.819 V11.1.0 (Dec. 2011) 3rd Generation Partnership Project; Technical Specification Group Radio Access Network; Coordinated Multi-Point Operation for LTE Physical Layer Aspects (Release 11), Dec. 2011, 69 pages.

U.S. Final Action in U.S. Appl. No. 15/499,131 dated Oct. 3, 2018, 29 pages.

U.S. Office Action from related case U.S. Appl. No. 15/498,962 dated Apr. 11, 2019, 28 pages.

U.S. Office Action in U.S. Appl. No. 15/499,131 dated Apr. 8, 2019, 26 pages.

U.S. Office Action in U.S. Appl. No. 15/499,131 dated May 18, 2018, 25 pages.

PCT IPRP from PCT/GB2018/050799, dated Jul. 11, 2019, 19 pages.

U.S. Office Action in U.S. Appl. No. 15/499,131 dated Jul. 25, 2019, 26 pages.

U.S. Office Action from related case U.S. Appl. No. 15/498,962 dated Oct. 31, 2019, 28 pages.

\* cited by examiner

APPARATUS AND METHOD FOR IMPROVING CONNECTIVITY FOR ITEMS OF USER EQUIPMENT IN A WIRELESS NETWORK

BACKGROUND

The present technique relates to an apparatus and method for improving connectivity for items of user equipment in a wireless network.

As more and more users embrace mobile technology, this is placing ever increasing demands on the mobile networks used to support mobile communication. The networks are required to not only support an ever increasing number of devices, but also as the functionality associated with such devices becomes ever more complex, so this has also increased the capacity requirements within the network.

Accordingly, there is a need for network operators to provide increased network coverage, but also to improve network capacity so as to service the high performance demands placed upon the network by users of modern smartphones and the like.

The problems of providing sufficient network coverage and capacity can be particularly problematic in urban environments, where there is typically not only a high density of users, but where the urban infrastructure, such as large buildings, can significantly attenuate signals, and hence exacerbate the problem of seeking to provide sufficient network coverage and network capacity to service the users. Accordingly, it would be desirable to provide techniques that enabled coverage and capacity to be improved.

In addition, as innovative techniques are developed to seek to address these issues, improvements in backhaul connectivity would be desirable to manage the increasing volume of traffic to be routed over backhaul connections.

SUMMARY

In one example configuration, there is provided an apparatus comprising: a first antenna system to provide a first sector of a network; a second antenna system to provide a second sector of the network; a third antenna system to communicate with a base station of the network to provide a common wireless backhaul link for said first sector and said second sector; an interface to an internet connection of a building in which the apparatus is deployed; and backhaul management circuitry operable, in at least one mode of operation, to control utilisation of both the internet connection and the common wireless backhaul link to provide backhaul connectivity to the network for items of user equipment connected to the apparatus via the first and second antenna systems.

In another example configuration, there is provided a method of operating an apparatus having first, second and third antenna systems to provide network coverage in a wireless network, comprising: employing the first antenna system to provide a first sector of a network; employing the second antenna system to provide a second sector of the network; employing the third antenna system to communicate with a base station of the network to provide a common wireless backhaul link for said first sector and said second sector; connecting the apparatus to an internet connection of a building in which the apparatus is deployed; and in at least one mode of operation, controlling utilisation of both the internet connection and the common wireless backhaul link to provide backhaul connectivity to the network for items of user equipment connected to the apparatus via the first and second antenna systems.

In a yet further example configuration, there is provided an apparatus comprising: first antenna means for providing a first sector of a network; second antenna means for providing a second sector of the network; third antenna means for communicating with a base station of the network to provide a common wireless backhaul link for said first sector and said second sector; interface means for interfacing to an internet connection of a building in which the apparatus is deployed; and backhaul management means for controlling, in at least one mode of operation, utilisation of both the internet connection and the common wireless backhaul link to provide backhaul connectivity to the network for items of user equipment connected to the apparatus via the first and second antenna means.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
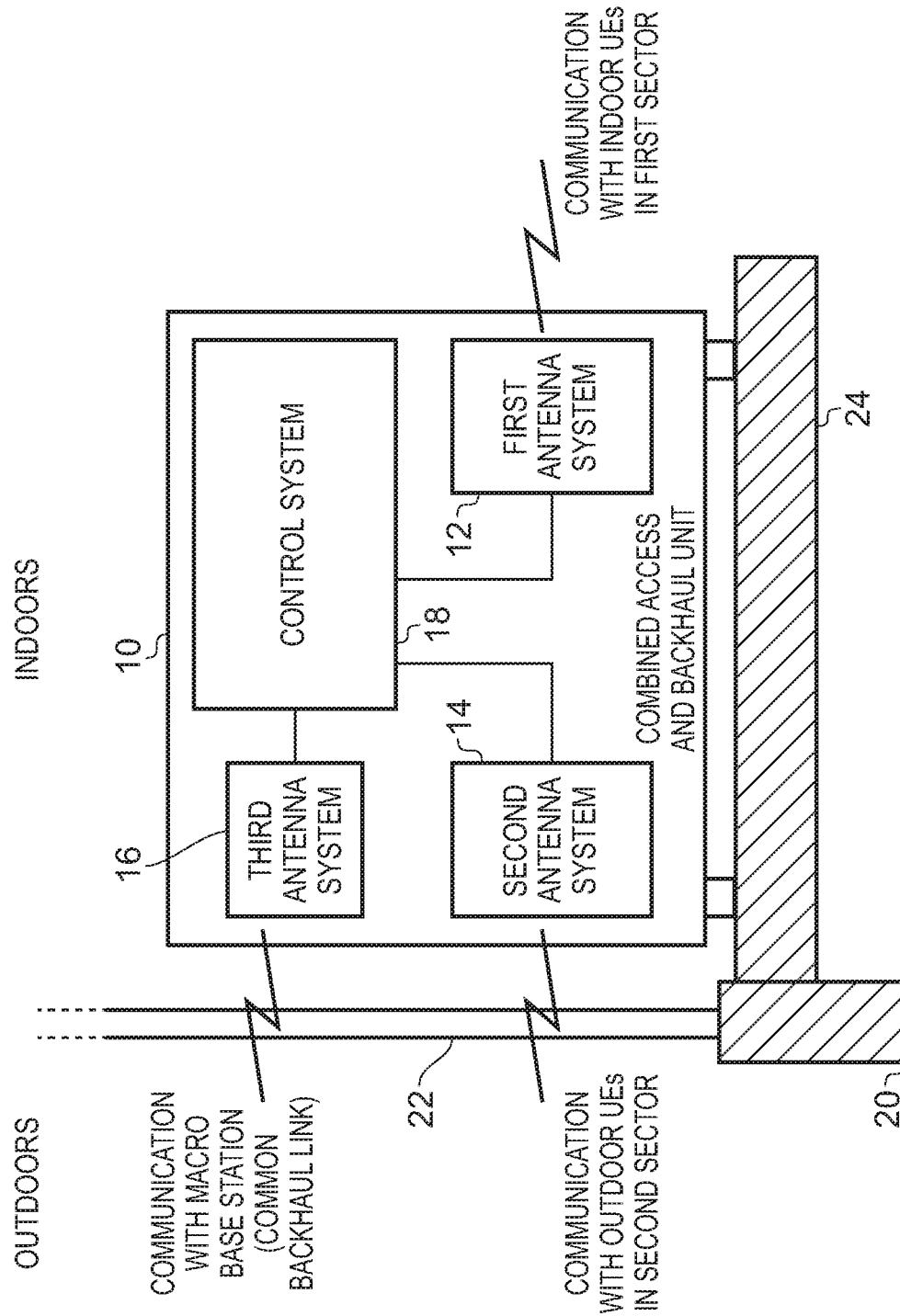
FIG. 1 is a block diagram schematically illustrating an apparatus in accordance with one embodiment.

Before discussing the embodiments with reference to the accompanying figures, the following description of embodiments is provided.

In one embodiment, an apparatus is provided that has a first antenna system for providing a first sector of a network and a second antenna system for providing a second sector of the network. The apparatus is arranged to communicate with a base station of the network via a third antenna system, the third antenna system providing a common wireless backhaul link for the first sector and the second sector.

By such an arrangement, the apparatus can provide significant network coverage and capacity improvements within a wireless network. In particular, by providing both a first sector of coverage and a second sector of coverage through the first and second antenna systems, it is possible to seek to alleviate multiple coverage and/or capacity issues using a single apparatus. For example, as will be discussed in more detail later, the apparatus can be deployed within a building such that the first antenna system can provide a first sector of coverage that extends into the building to provide enhanced availability of the network inside the building. Items of user equipment that connect to the first antenna system from within the building are then connected into the network via the common wireless backhaul link. However, in addition, the second antenna system can be arranged, for example, so that the second sector extends externally to the building to provide an additional source of network coverage to items of user equipment external to the building. Again, when an item of user equipment connects via the second antenna system, it may be connected into the network via the common wireless backhaul link.

However, whilst such an apparatus can provide significant improvements in terms of network coverage and capacity, there is a potential for the common wireless backhaul link to become a bottleneck in traffic flow through the network. In accordance with the described embodiments, this issue is alleviated by providing the apparatus with an interface to an internet connection of a building in which the apparatus is deployed. Backhaul management circuitry is then provided which is operable, in at least one mode of operation, to control utilisation of both the internet connection and the common wireless backhaul link to provide backhaul connectivity to the network for items of user equipment connected to the apparatus via the first and second antenna systems.

By allowing the backhaul management circuitry to make use of the provided internet connection within the building, it is possible to enhance the overall performance of the backhaul connection. Firstly, if the performance of the common wireless backhaul link degrades for any reason, the ability to use the internet connection for backhaul traffic provides the backhaul management circuitry with a replacement mechanism to use. However, in addition, during normal operation the backhaul management circuitry may employ link aggregation techniques so as to use the common wireless backhaul link and the internet connection in combination to increase the overall capacity of the backhaul connection.

Such an apparatus can readily be deployed in significant numbers in a dense urban environment, enabling a significant number of small cells to be established, each providing multiple sectors of coverage, for example each providing an indoor sector and an outdoor sector.

There are a number of ways in which the internet connection can be made available to the backhaul management circuitry. For example, during setup, the person installing the apparatus may be prompted to enter internet connection details, such as a user ID and password, to provide the apparatus with access to the internet connection. Thereafter, the apparatus' use of the internet connection or the wireless backhaul link can be made transparent to the user(s), with the backhaul management circuitry providing various techniques to determine at any point in time which of the two possible backhaul mechanisms to use.

In some embodiments, the apparatus may be arranged so that the backhaul management circuitry always has the ability to use either or both of the wireless backhaul link mechanism and the internet connection mechanism for transporting backhaul traffic. However, in an alternative embodiment, the apparatus may be provided with different modes of operation, so that the additional capability to use the internet connection for backhaul traffic can be selectively turned on or off.

In one embodiment, the apparatus may be provided with a wired, for example Ethernet, connection to the internet, but in an alternative embodiment the interface is a Wi-Fi interface, removing the need for any physical connection to be made by the apparatus in order to access the internet.

There are a number of ways in which the backhaul management circuitry may be configured to determine when to use the common wireless backhaul link and when to use the internet connection for backhaul traffic. However, in one embodiment, the backhaul management circuitry comprises traffic type analysis circuitry to determine, for each block of backhaul traffic, a type of that traffic, and to select which one of the internet connection and the common wireless backhaul path is used for propagation of that block of backhaul traffic dependent on the determined type of that traffic. Hence, the backhaul management circuitry can determine which mechanism to use dependent on the nature of the traffic that is being transmitted.

Furthermore, the granularity at which the backhaul management circuitry determines the mechanism to be used can be varied dependent upon embodiment, with the block of backhaul traffic being chosen accordingly. However, in one embodiment, each block comprises a packet, such that the determination as to which of the internet connection and the common wireless backhaul link to use is made on a packet-by-packet basis. This can provide a very fine-grained level of control over which of the available backhaul mechanisms is used for transmission of the backhaul traffic.

There are a number of ways in which the backhaul management circuitry may categorise the traffic based on its type. However, in one embodiment the backhaul management circuitry determines from the type of traffic whether the associated block of backhaul traffic is considered to be low importance or high importance, and is arranged to route backhaul traffic of low importance via the internet connection, and to route backhaul traffic of high importance via the common wireless backhaul link.

In particular, the common wireless backhaul link is a dedicated backhaul link provided for the apparatus and may be arranged to be permanently available. In contrast, the internet connection will be shared with many devices, and the connection quality available via the internet connection may vary significantly over time. Accordingly, in one embodiment, the internet connection is used opportunistically to send traffic that is considered to be of low importance, hence freeing up the available resources of the common wireless backhaul link for sending traffic of high importance.

Whether traffic is considered to be of high importance or low importance will vary dependent upon implementation. However, in one embodiment backhaul traffic is considered to be of high importance if timing of delivery of that backhaul traffic is important. The importance of the timing of delivery for any particular packet of backhaul traffic can be dependent upon a variety of factors. For example, certain packets of traffic may be identified as real-time traffic, where it is important that the traffic is delivered in a particular timeframe. As another example, certain users may have particular guaranteed quality of service (QoS), and this may cause at least some types of the traffic relating to one user's items of user equipment to be given a higher priority than traffic relating to another user, and hence be considered to be of high importance.

As another example, the type of the traffic itself may directly indicate importance. For instance, in one embodiment the backhaul traffic may comprise control traffic pertaining to control of the apparatus and user traffic pertaining to communications between the apparatus and connected items of user equipment. The backhaul management circuitry may then be arranged to treat control traffic as of high importance, and to selectively treat each block of user traffic as of high importance or low importance dependent on a type of that user traffic. Hence, in such an embodiment the control traffic may always be treated as being of high importance, but the user traffic can be selectively treated as of high importance or low importance depending on the nature of each block of user traffic.

In one embodiment, the backhaul management circuitry comprises traffic disassembly circuitry configured, in dependence on the type of traffic determined by the traffic type analysis circuitry, to disassemble a stream of backhaul traffic to be sent from the apparatus in order to form a first sub-stream to be sent via the common wireless backhaul link and a second sub-stream to be sent via the internet connection.

These separate sub-streams can then later be reassembled within the network, for example, using components provided within the network carrier's core infrastructure. For example, in one embodiment, a network component may be provided for deploying in a network that comprises at least one instance of the above described apparatus. The network component may comprise a first interface to receive the first sub-stream via a macro base station of the network, a second interface to receive the second sub-stream via an internet connection, and traffic reassembly circuitry configured to aggregate together the first and second sub-streams in order to form a stream of backhaul traffic for onward propagation within the network.

In one embodiment, the backhaul disassembly/reassembly mechanism can also be employed in the reverse direction to control routing of downstream backhaul traffic from the carrier's core infrastructure to the above-described apparatus. In such instances the apparatus may further comprise traffic reassembly circuitry, responsive to a first downlink sub-stream received via the third antenna system and a second downlink sub-stream received via said interface to the internet connection, to aggregate together the first and second downlink sub-streams in order to form a stream of downlink backhaul traffic.

Further, in such instances, the network component would further comprise downlink traffic disassembly circuitry to disassemble a stream of downlink backhaul traffic to be sent to the apparatus, in order to form a first downlink sub-stream to be sent to the apparatus via the common wireless backhaul link and a second downlink sub-stream to be sent to the apparatus via the internet connection.

The first, second and third antenna systems can be configured in a variety of ways, but in one embodiment the third antenna system operates with a signal frequency different to the signal frequency employed by the first and second antenna systems. This can alleviate interference between the signals being processed by the first and second antenna systems and the signals being processed by the third antenna system, hence providing a more reliable and efficient backhaul link via the third antenna system. However, in one embodiment the different frequency used for the third antenna system can still be in the same frequency band as is used by the first and second antenna systems, enabling efficient utilisation of the network resources.

The above described apparatus can be deployed in a variety of settings. However, in one embodiment the first and the second antenna systems may be arranged so that when the apparatus is deployed at a periphery of a building, the first sector provided by the first antenna system extends into the building to provide enhanced availability of the network to items of user equipment within the building. However, in addition the second sector extends externally to the building to provide an additional source of network coverage to items of user equipment external to the building.

Modern telecommunications Standards, such as the Long-Term Evolution (LTE) Standard or the 5G New Radio (NR) Standard, allow for high-speed wireless communication with items of user equipment. However, the signals propagated from the base stations typically do not have good indoor penetration. By placing the above described apparatus at a periphery of a building, a good quality link can typically be established via the third antenna system to a base station of the network, with the use of the first antenna system then allowing for a first sector of coverage to be established that extends into the building to provide enhanced availability of the network inside the building.

However, in addition, in urban environments it is also often the case that items of user equipment in the open environment, for example belonging to users moving around at street level between buildings, can experience poor connectivity. In particular, pockets of poor network coverage may develop, and even in areas where there is network coverage, the link quality established with the base station may be relatively poor, resulting in reduced bit rates observed by the item of user equipment, and a less efficient utilisation of the available network spectrum. This reduces not only the quality of the service observed by certain users, but also can degrade the overall spectral efficiency of the network.

However, in accordance with the above described apparatus, the same apparatus that is used to create a first sector that extends into the building to provide enhanced availability of the network to items of user equipment within the building, is also able to re-radiate network coverage externally to the building, by use of the second antenna system to provide an additional, second, sector for the network. Accordingly, items of user equipment external to the building are now provided with a further connection option for connecting into the network. In particular, whilst it is still possible that they may connect directly to a macro base station of the network, when they are present within the geographical coverage area covered by the second sector they can instead connect to the network via the second antenna system of the apparatus, with the third antenna system then being used to provide a backhaul connection into the network for those users (along with users connected via the first antenna system), in combination with the internet connection as discussed earlier.

This provides significantly enhanced flexibility, and can also give rise to significant spectral efficiency improvements within the network. In particular, the apparatus can be configured to provide a high quality backhaul communication link to the base station of the network, supplemented by the additional internet connection backhaul link as appropriate, and in addition can provide high quality connections for items of user equipment residing within the first sector and the second sector. This can lead to the establishment of high performance links that can employ efficient modulation schemes to make more efficient use of the available spectrum, when compared with a situation where those items of user equipment instead establish a direct connection to the macro base station of the network. As a result, the overall spectral efficiency of the network can be increased.

The apparatus of the described embodiments may be positioned externally to the building at the periphery, for example by being mounted on an exterior wall of the building, but in one embodiment the apparatus is deployed inside the building at the periphery, in which event the second antenna system is configured to generate at least one beam pattern that propagates through the periphery to facilitate communication with at least one item of user equipment within the second sector. If desired, directional antennas can be used to generate a beam pattern that radiates in a desired direction externally to the building. For example, this second antenna system may be arranged so as to radiate a beam pattern that will ensure good coverage for users at street level. Alternatively, or in addition, the beam pattern created by the second antenna system may cause the second sector to extend across a street into an adjacent building, so that items of user equipment within that adjacent building may be able to connect into the network via the apparatus.

In situations where the apparatus is deployed inside the building at the periphery, the third antenna system may also be configured to generate at least one beam pattern that propagates through the periphery to provide the common wireless backhaul link. Again, directional antennas can be used if desired, to seek to improve the quality of the connection with the base station of the network, and thereby enhance the capacity of the common wireless backhaul link.

The apparatus can be deployed in a variety of locations, but in one embodiment is intended to be deployed adjacent to a window at the periphery of the building. In one particular embodiment, the apparatus is shaped so as to facilitate placement on a windowsill. This can provide a very convenient location for the apparatus, where it does not get in the way of users going about their business inside the building, and where it is likely that a strong connection with the base station of the network can be established.

By providing an apparatus that can be easily deployed within a building, this can provide a very cheap and efficient mechanism for a network operator to rapidly increase network coverage, whilst also facilitating improved spectral efficiency, and thereby enhancing the capacity of the network.

Particular embodiments will now be described with reference to the Figures.

FIG. 1 schematically illustrates an apparatus 10 as used in the described embodiments. Herein, the apparatus will also be referred to as a combined access and backhaul unit. As shown, the combined access and backhaul unit 10 may in one embodiment be positioned adjacent to a periphery 20, 22 of a building. In one particular embodiment, it is located on a windowsill 24 adjacent to a window 22 at the periphery of the building.

The combined access and backhaul unit 10 has a number of distinct antenna systems. In particular, a first antenna system is used to provide a first sector of the network that extends into the building so as to provide enhanced availability of the network to items of user equipment within the building. To access the network for any items of user equipment that connect via the first antenna system, it is necessary to connect the apparatus 10 into the network. This is achieved through use of the third antenna system 16, which is arranged to establish a backhaul link with a base station of the network. Since such a base station will typically be provided externally to the building, the third antenna system is arranged to generate at least one beam pattern that propagates through the window 22 to establish a wireless backhaul link with the base station.

Modern telecommunications Standards, such as the LTE Standard, allow for high-speed wireless communication with items of user equipment. However, the signals propagated from the base stations typically do not have good indoor penetration. By placing the apparatus 10 at a periphery of a building, a good quality link can typically be established via the third antenna system to a base station of the network, with the use of the first antenna system 12 then allowing for a first sector of coverage to be established that extends into the building to provide enhanced availability of the network inside the building.

However, in addition, in urban environments it is also often the case that items of user equipment in the open environment, for example belonging to users moving around at street level between buildings, can experience poor connectivity. For example, pockets of poor network coverage may develop, due to shadowing from buildings and the like, and even in areas where there is network coverage, the link quality established with the base station may be relatively poor. This can result not only in reduced quality of service observed by certain users, but also can degrade the overall spectral efficiency of the network due to the less efficient utilisation of the available network spectrum that can result from use of such poor quality links.

To address this problem, the combined access and backhaul unit 10 provides an additional antenna system, namely the second antenna system 14, which provides a second sector of the network, the second antenna system generating at least one beam pattern that propagates through the periphery 22 to facilitate communication with at least one item of user equipment external to the building. Hence, through use of the second antenna system, the combined access and backhaul unit 10 can re-radiate network coverage externally to the building, such that items of user equipment external to the building and falling within the coverage area of the second sector are now provided with a further connection option for connecting into the network.

For any users that connect to the apparatus 10 via either the first antenna system or the second antenna system, then the third antenna system is used to provide a common wireless backhaul link back into the network. By such an approach, it is possible to establish good quality links with items of user equipment in both the first and second sectors, through use of the respective first and second antenna systems. In combination with a good quality backhaul link provided by the third antenna system to a macro base station of the network, this can result in the various items of user equipment connected to the network via the apparatus 10 being provided with higher quality links into the network, allowing for more efficient use of the available network spectrum when compared with a situation where those items of user equipment instead establish a direct connection to a macro base station of the network. As a result, the overall spectral efficiency of the network can be increased.

It should be noted that if desired the apparatus 10 could be mounted externally to the building at the periphery, in which case the first antenna system would generate at least one beam pattern that propagates through the periphery into the building, whilst the second and third antenna systems' beam patterns would no longer need to propagate through the periphery. However, for the following description of embodiments, it will be assumed that the apparatus 10 is provided internally at the periphery of the building. This can enable a reduction in the cost of the apparatus, by avoiding the need to weatherproof the housing, and also provides for significantly simplified deployment. In one particular embodiment, the apparatus 10 is shaped so that it can readily be placed on a windowsill or the like within the building, this providing a very convenient location where it does not get in the way of users going about their business inside the building, and where it is likely that a strong connection with the base station of the network can be established.

Each of the antenna systems 12, 14, 16 will include not only an array of antenna elements used to transmit and receive the RF signals, but also the associated RF stage circuit elements that process the transmitted and received RF signals. In addition, each of the antenna systems will have associated baseband stage (i.e. digital signal processing stage) circuits for processing the transmit signals prior to them being converted into RF signals, and to process received signals after they have been converted from RF signals into baseband signals. These baseband stage circuits can be considered to be provided as part of the antenna system blocks 12, 14, 16, or may be considered to be part of the associated control system 18 that controls the operation of the various antenna systems, and the interactions between them. The control system 18 will provide all of the required control functionality for the different antenna systems, as well as controlling the routing of signals between the antenna systems so that signals received via the first and second antenna systems from items of user equipment can be routed through the third antenna system over the backhaul link to the network, and conversely signals to be propagated to those items of user equipment that are received over the backhaul link by the third antenna system can be routed to the appropriate first and second antenna systems for transmission to the required items of user equipment.

It should be noted that FIG. 1 is not intended to illustrate how the various components are laid out within the combined access and backhaul unit 10, but instead is merely a schematic illustration of the different antenna systems and associated control system. By way of example, whilst the third antenna system 16 is shown above the second antenna system 14, in one embodiment the second and third antenna systems are actually placed side by side, and hence when considering the vertical elevation view of the apparatus 10 as shown in FIG. 1, one of the second and third antenna systems would reside behind the other.

Figure 2:
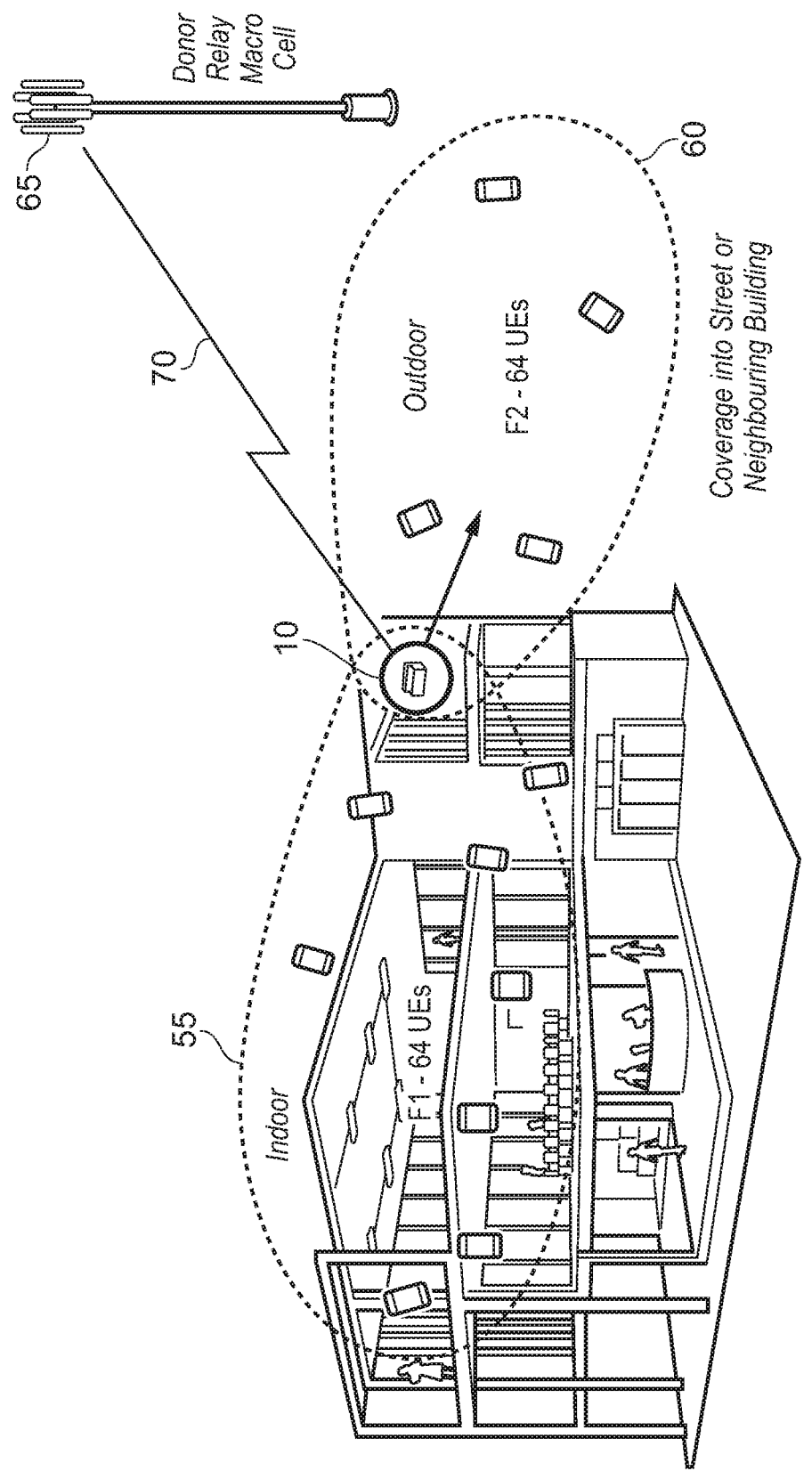
FIG. 2 illustrates how the apparatus of the described embodiments creates indoor and outside sectors in accordance with one embodiment.

FIG. 2 schematically illustrates how the apparatus 10 may be used to establish both indoor and outdoor sectors for connection of items of user equipment. In particular, as shown, the combined access and backhaul unit 10 can be arranged to produce a first sector 55 of coverage through the beam pattern(s) employed by the first antenna system, and in addition can create an outdoor sector of coverage 60 through the beam pattern(s) deployed by the second antenna system 14. A common wireless backhaul link 70 can then be established by the third antenna system 16 communicating with a macro base station 65, also referred to herein as a donor relay macrocell, or a donor eNodeB (DeNB).

The first, second and third antenna systems can be arranged in a variety of ways, but in one embodiment each of those three antenna systems comprises an array of antenna elements, which are configured in a manner to allow an increase in spectral efficiency of the network when items of user equipment connect to the network via the apparatus 10 rather than connecting directly to a macro base station such as the illustrated base station 65. Since the apparatus is not a handheld device like normal items of user equipment, it is not constrained by size and power factors that would typically constrain the antennas within such handheld user devices. Hence, the array of antenna elements used in the various first, second and third antenna systems can be provided with characteristics that allow a more efficient modulation of signals than may be possible using the antenna system of an item of user equipment connecting to the apparatus 10.

For example, more antenna elements may be provided within each of the arrays, those antenna elements can be of a larger size, the antenna elements may be operated with higher power, and/or may be configured to provide higher gain, than would typically be the case for antenna elements within handheld items of user equipment. As a result, it has been found that a significant number of items of user equipment can connect to each combined access and backhaul unit 10, whilst providing good quality links into the network through the common wireless backhaul link 70. This can lead to a significant increase in the overall spectral efficiency of the network when compared with the situation where each of those items of user equipment individually connected to a macro base station of the network, for example by allowing more efficient modulation schemes to be used for the communications. In one embodiment up to 128 items of user equipment may be connected into each combined access and backhaul unit 10, and as schematically illustrated in FIG. 2 this could for example allow 64 items of user equipment to connect via the indoor sector 55 and another 64 items of user equipment to connect via the outdoor sector 60.

Figure 3:
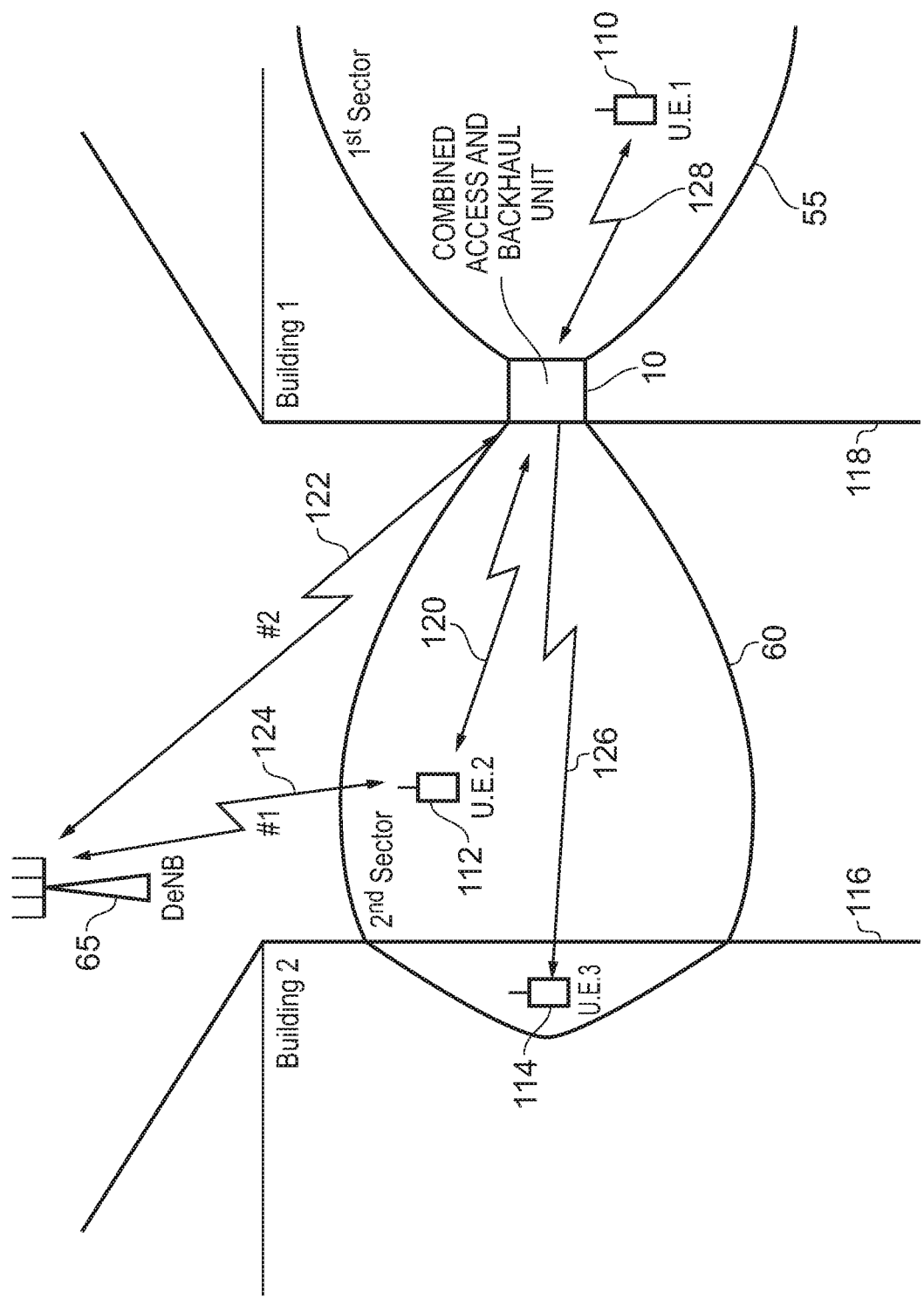
FIG. 3 illustrates how users may connect to the network using the apparatus of the described embodiments.

FIG. 3 schematically illustrates an urban environment in which a combined access and backhaul unit 10 is located on a windowsill in a first building 118, that first building 118 being positioned opposite to an adjacent building 116. External to both buildings a donor eNodeB (DeNB) 65 is provided to form a macro base station of the network. The combined access and backhaul unit 10 creates a first sector 55 of coverage through use of the first antenna system, and a second sector 60 of coverage that propagates into the open space external to the building. As schematically shown in FIG. 3 the second sector may in one embodiment extend far enough that it permeates inside the second building 116.

Considering first the item of user equipment 112 that is being operated externally to both buildings, this item of user equipment may have the option to connect directly to the donor eNodeB 65 as illustrated schematically by the communication path 124. However, through the provision of the combined access and backhaul unit 10, it also has the option to connect into the network via the unit 10, and in particular can establish a connection 120 with the second antenna system. If this route is taken, then the connection into the network will occur through the combination of the communication link 120 and the common backhaul link 122 provided by the third antenna system.

In some instances, it may be the case that the quality of the connection between the item of user equipment 112 and the second antenna system of the combined access and backhaul unit 10 is better than the quality of the communication link 124, and as a result the item of user equipment 112 may decide to connect to the unit 10, rather than directly to the donor eNodeB 65. For instance, the link 120 may allow a more efficient modulation scheme to be used than would be the case for the link 124. Provided a high performance backhaul link 122 can also be provided, then overall an improvement in spectral efficiency may be achieved by the item of user equipment 112 connecting into the network via the paths 120, 122, rather than directly over path 124.

It should be noted that this benefit may also be available to the item of user equipment 114 within the second building 116, in situations where that item of user equipment falls within the coverage area of the second sector 60. Accordingly, it may choose to access the network via the communication link 126 with the second antenna system 14, with the unit 10 then completing the connection into the network via the common backhaul link 122. In particular, due to the relative location of the second building 116 and the donor eNodeB 65, it may be that the item of user equipment 114 only obtains a relatively poor connection directly to donor eNodeB 65, whereas it may be able to make a higher quality connection 126 with the combined access and backhaul unit 10.

As also shown in FIG. 3, an item of user equipment 110 within the first sector 55 may connect into the donor eNodeB 65 via the combined access and backhaul unit 10, using a communication link 128 to the first antenna system, and with the unit 10 then using the common wireless backhaul link 122 to connect that item of user equipment 10 into the network.

In one embodiment, the frequency channel (i.e. frequency) used for communicating over the wireless backhaul link 122 is the same as the frequency channel used when items of user equipment connect directly to the donor eNodeB, and hence the same frequency channel will also be used for a connection made via path 124. However, the frequency channel used for communications between items of user equipment and the first and second antenna systems 12, 14 may in one embodiment be a different frequency channel to the frequency channel used for the communication links 122, 124. This can serve to mitigate interference between the communications within the first and second sectors 55, 60 using the first and second antenna systems 12, 14, and the communication links with the macro base station. However, in one embodiment, it is possible for all of these communication links to be provided within the same frequency band, hence allowing in-band access and backhaul links to be established.

Figure 4:
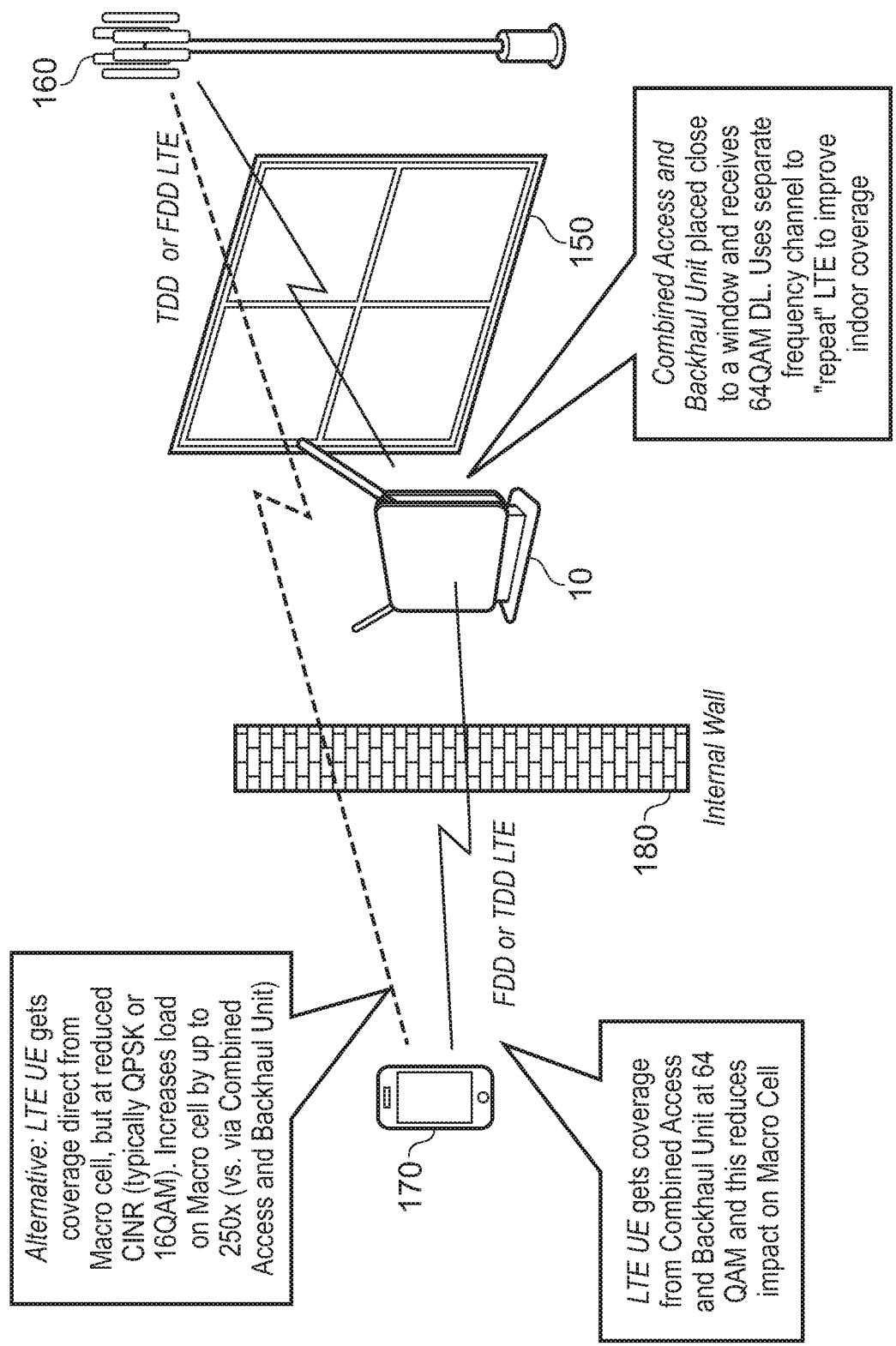
FIG. 4 schematically illustrates how improved spectral efficiency may be achieved when an item of user equipment connects to the network via the apparatus of the described embodiments.

FIG. 4 schematically illustrates how the use of the combined access and backhaul unit 10 can improve the overall quality of the connection for an item of user equipment. In this example, an indoor scenario is considered, where the unit 10 establishes a backhaul communication link with the macro base station 160 through the window 150. It is assumed here that an item of user equipment 170 within the building has the possibility of making a direct connection with the macro base station 160, but that various attenuating factors such as the internal wall 180, the window 150, etc, mean that the direct link is of a relatively poor quality, hence requiring relatively inefficient modulation schemes such as QPSK or 16QAM to be used. However, it is assumed that the wireless backhaul link can use a much more efficient modulation scheme such as 64QAM, and that similarly that more efficient modulation scheme can also be used for communications between the unit 10 and the item of user equipment 170. As a result, it is more spectrally efficient for the item of user equipment 170 to connect to the macro base station 160 via the combined access and backhaul unit 10, since through this connection method there is less overall impact on the macro cell, and hence overall spectral efficiency of the network can be increased.

It has been found that the use of the combined access and backhaul unit 10 can improve the spectral efficiency of the network in many situations, but provides particularly enhanced improvements in spectral efficiency and user equipment performance when deployed in the middle to outer regions of a coverage area of a macrocell provided by a DeNB.

Whilst the above described unit can provide significant network coverage and capacity benefits, there is a possibility that the shared backhaul connection provided by the third antenna system could become a bottleneck within the system, particularly where a significant number of users indoors connect to the first antenna system, whilst simultaneously a significant number of users are connecting from outside the building using the second antenna system. Further, with the ever increasing functionality of smartphones, the bandwidth demands of individual items of user equipment can be significant.

To seek to alleviate this issue, the unit 10 is provided with an additional resource for providing the backhaul connection, which can be used selectively instead of, or in combination with, the wireless backhaul link established by the third antenna system 16. In particular, in one embodiment, the unit is provided with an internet connection which can selectively be used under the control of backhaul management circuitry within the unit 10 to replace or supplement the backhaul connectivity available via the third antenna system.

Figure 5:
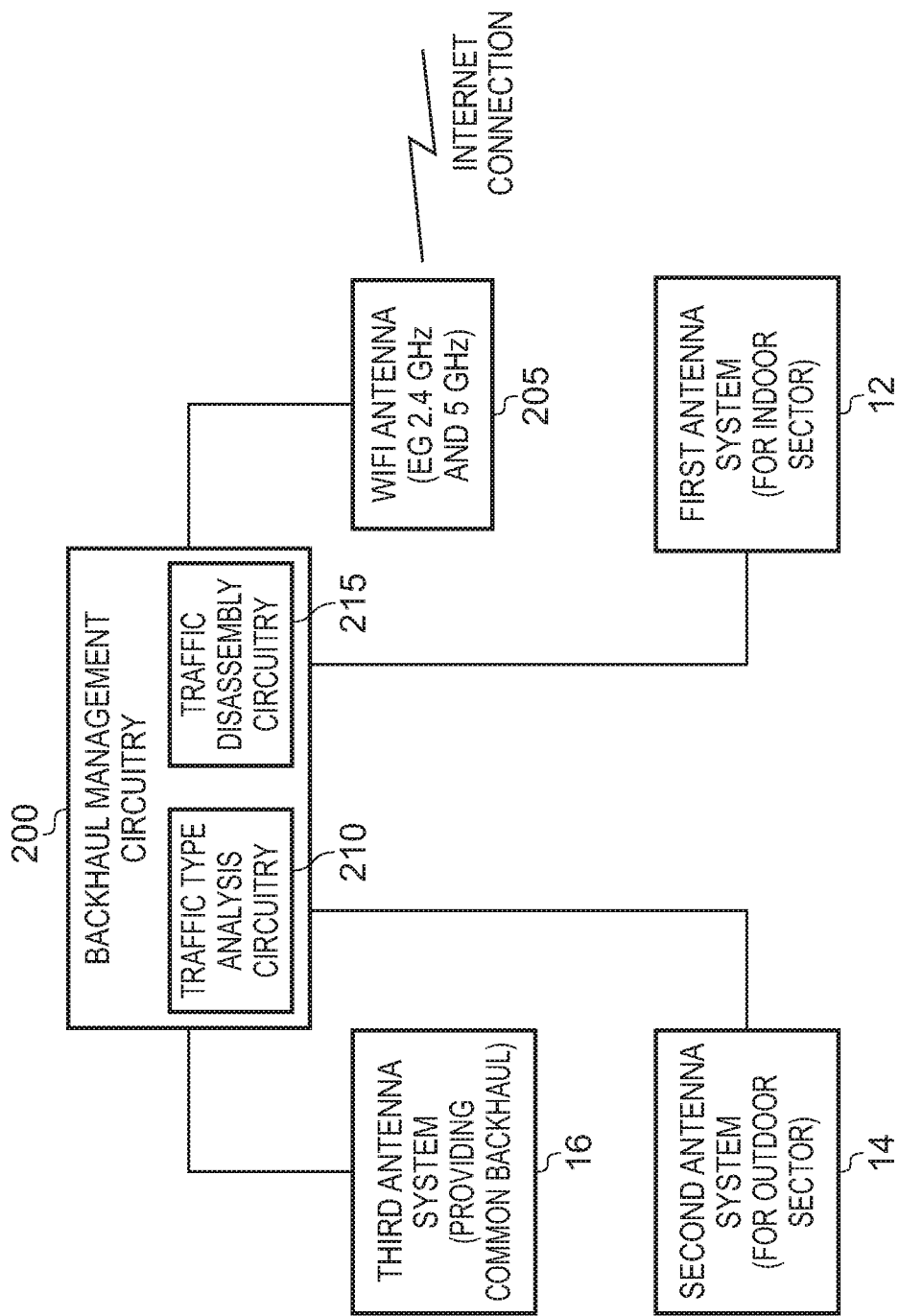
FIG. 5 is a block diagram illustrating use of backhaul management circuitry in accordance with one embodiment.

FIG. 5 is a block diagram illustrating the operation of the backhaul management circuitry in accordance with one embodiment. In particular, in this embodiment, in addition to the first, second and third antenna systems 12, 14, 16, one or more Wi-Fi antennas 205 may be provided, to enable a wireless internet connection to be established in respect of the internet provision within the building in which the unit is deployed. As well as allowing additional functionality, for example during setup of the device, or to allow connectivity for software and firmware updates, the Wi-Fi connection established through the Wi-Fi antenna circuitry 205 can be utilised as a further mechanism for handling backhaul traffic in relation to the items of user equipment connected to the unit 10 via the first and second antenna systems 12, 14.

As shown in FIG. 5, backhaul management circuitry 200 may be provided within the unit that interconnects the various antenna systems 12, 14, 16, and the Wi-Fi antenna circuitry 205, and which controls which of the wireless backhaul link provided by the third antenna system 16 and the internet connection provided by the Wi-Fi antenna circuitry 205 is used at any point in time to handle backhaul traffic. For example, if at any periods in time the wireless backhaul link provided by the third antenna system 16 exhibits poor connectivity, the backhaul management circuitry could instead switch to using the internet connection for the backhaul connection, until such time as the quality of the wireless backhaul link provided by the third antenna system improves. However, in addition, whilst the third antenna system 16 is still being used for backhaul traffic, the use of the Wi-Fi antenna circuitry 205 can provide an additional backhaul path, with the backhaul management circuitry employing link aggregation techniques to seek to enhance the overall capacity of the backhaul connection provided by the unit 10. This means that the capacity of each combined access and backhaul unit 10 can exceed the capacity available via the wireless backhaul link provisioned through the third antenna system, by enabling at least a proportion of a carrier's traffic to be offloaded onto an existing broadband connection. The provision of the two separate mechanisms for backhaul communication ensures better availability and reliability.

The backhaul management circuitry 200 may be arranged in a variety of ways in order to determine, at any point in time, which backhaul mechanism should be used. The granularity with which the backhaul management circuitry makes a decision about the appropriate backhaul mechanism to use can be varied dependent on embodiment, with an appropriate block of backhaul traffic being considered having regards to the current granularity. In one particular embodiment, the determination is made by the backhaul management circuitry for each packet of backhaul traffic, allowing a very fine-grained switching between the different backhaul mechanisms on a packet-by-packet basis.

In one embodiment, the backhaul management circuitry 200 includes traffic type analysis circuitry 210 to determine, for each packet, a type of traffic associated with that packet, and then to select which one of the internet connection and the common wireless backhaul path should be used for propagation of that packet dependent on the determined type of traffic.

It will be appreciated that the backhaul traffic can take a variety of forms. For example, it may comprise both user traffic and control traffic. Typically, the control traffic will be considered to be of higher importance than the user traffic, since efficient delivery of that control traffic is required to ensure correct operation of the system. Nevertheless, certain types of user traffic can also be considered to be more important than other types of user traffic. For example, certain user traffic may be specified as realtime traffic, whilst others may be specified as non-realtime traffic, and hence typically the realtime traffic will be considered to be of higher importance than the non-realtime traffic. As another example, different users can have different agreed quality of service (QoS) commitments from the network provider, and accordingly packets of user backhaul traffic associated with users having high QoS commitments may be treated as of more importance than traffic associated with a lower QoS commitment. The classification of the type of traffic can then be used to decide which backhaul mechanism to use, this being illustrated by way of example with reference to FIG. 6.

In particular, at step 250 the backhaul management circuitry 200 determines whether there is a new packet to transmit over the backhaul. If so, then at step 255 the traffic type analysis circuitry 210 analyses the traffic to determine its type. At step 260 it is determined whether the type analysis indicates that the traffic is control traffic rather than user traffic. If it is, then in one embodiment the control traffic is always considered to be of high importance, and accordingly the process proceeds to step 270 where the backhaul packet is transmitted via the common wireless backhaul link using the third antenna system 16.

If at step 260 it is determined that the packet does not relate to control traffic, then it is determined at step 265 whether the analysis performed at step 255 indicates that the user traffic is of high importance. If so, the process proceeds to step 270, where the common wireless backhaul link is used for transmitting the backhaul packet. However, otherwise the process proceeds to step 270 where the backhaul packet is transmitted via the Wi-Fi connection using the Wi-Fi antenna circuitry 205.

Figure 6:
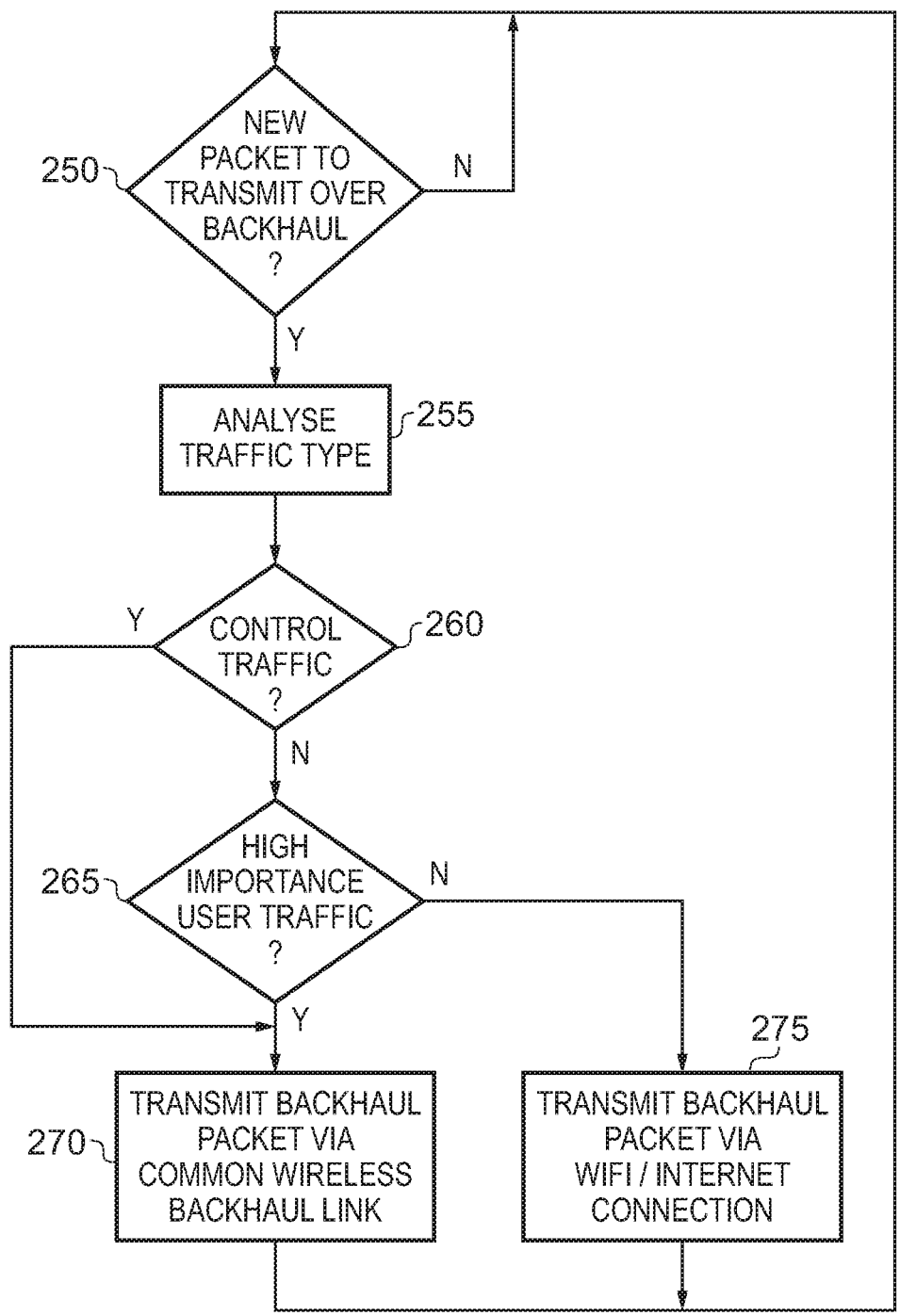
FIG. 6 is a flow diagram illustrating the operation of the backhaul management circuitry in accordance with one embodiment.

As shown in FIG. 6, in one embodiment the analysis is performed independently for each new packet being transmitted, allowing for fine-grained control of which mechanisms are used for backhaul communication on a packet-by-packet basis.

In the described embodiment, the common wireless backhaul link established through the third antenna system 16 is a dedicated link available for use in relation to items of user equipment connected via either the first or second antenna systems 12, 14. Further, the antenna elements forming the antenna array within the third antenna system are typically of a number and/or size, and are powered at a power level sufficient, to ensure that a good quality connection is typically established with the macro base station. However, in contrast the internet connection is likely to be shared by many different items of equipment within the building, and hence whilst it is possible that that internet connection will provide a good quality link, the actual quality of the link may vary significantly over time, and hence in one embodiment is treated as being less reliable than the wireless backhaul communication link via the third antenna system. It is for this reason that in one embodiment it is the lower importance traffic that is offloaded onto the internet connection mechanism, this freeing up resource within the wireless backhaul link of the third antenna system for handling of the more important backhaul traffic. By such an approach, the unit 10 can provide a better user experience and faster connection speed than a direct connection to either the LTE macrocell or to the wired broadband network.

Such an approach also enables "Quality of Experience" (QoE) of applications on smartphones, tablets and other devices to be maintained in contended situations by placing certain traffic on the building internet link, and other traffic on the common wireless backhaul link. Commonly-owned copending publication number US 2016/0381585 A1 (application Ser. No. 15/187,570), the entire contents of which are hereby incorporated by reference, describes a system having a single backhaul link, within which multiple bearers are used as resources, and where a congestion determination mechanism is used to determine which bearers (some of which may be guaranteed bit rate (GBR) bearers) are used, based on QoS considerations. A similar technique may be used in the above described embodiments to determine when to use each of the two different backhaul mechanisms, which for this purpose can be considered to be different bearers.

Figure 7:
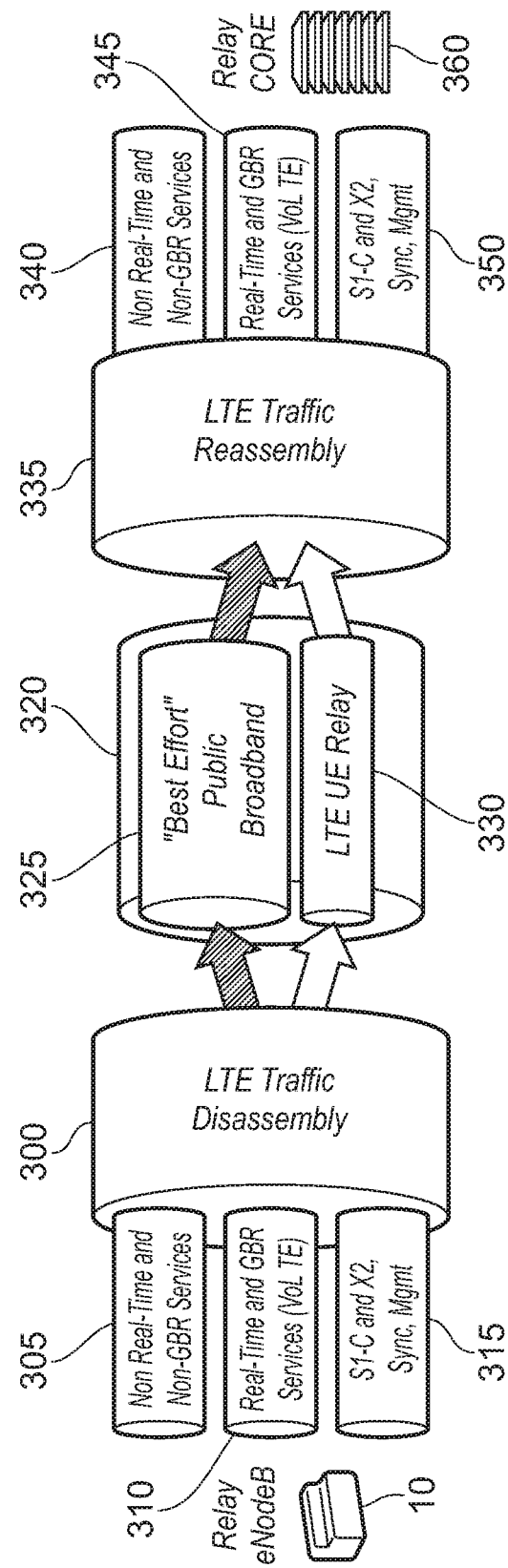
FIG. 7 is a diagram schematically illustrating how in one embodiment backhaul traffic may be disassembled to facilitate use of both the wireless backhaul link provided by the third antenna system and the internet connection for backhaul connectivity to the network, with the backhaul traffic then being reassembled for onward propagation.

FIG. 7 schematically illustrates how, based on the analysis performed by the backhaul management circuitry, a stream of backhaul traffic is disassembled to form different sub-streams, one to be sent via the internet connection and one to be sent via the wireless LTE backhaul link established through the third antennas system 16. In particular, traffic disassembly circuitry 215 (see FIG. 5) within the backhaul management circuitry 200 can be arranged to perform traffic disassembly operations 300 in order to create the separate sub-streams of backhaul traffic.

As shown schematically in the left hand side of FIG. 7, the traffic to be transmitted over the backhaul can take a variety of forms, for example, it can be non-realtime or non-guaranteed bit rate (Non-GBR) traffic 305, or may be realtime and/or GBR traffic 310. The traffic type analysis circuitry 210 can distinguish between these two different types of user traffic, such that the non-realtime and/or non-GBR traffic is extracted into a sub-stream that is routed via the public broadband connection 325. Conversely, the realtime and GBR traffic 310 can be extracted by the LTE traffic disassembly operations to generate a sub-stream that is routed via the LTE wireless backhaul communication link 330 provided through the third antenna system 16.

Similarly, as mentioned earlier, the stream of backhaul traffic may include control packets 315, and in one embodiment these are always treated as high priority, and accordingly the LTE traffic disassembly operations extract those packets and route them in the sub-stream that passes via the LTE wireless backhaul communication link 330.

As schematically shown in FIG. 7, the broadband link 325 and the LTE wireless backhaul link 330 collectively form a higher capacity connection mechanism 320, that can enable an overall increase in the capacity of the unit 10. The traffic passing through the public broadband connection 325 is routed via the public internet into a network carrier's core infrastructure, whilst the traffic passing via the LTE wireless backhaul link 330 is routed via a donor macrocell into the network carrier's core infrastructure. Within that core infrastructure, LTE traffic reassembly operations 335 can be used to reconstruct the original backhaul traffic stream from the two sub-streams received, so that the three different example categories of backhaul traffic 340, 345, 350 can be propagated on to the relay core components 360.

Whilst FIG. 7 shows the use of the disassembly/reassembly mechanism in connection with uplink backhaul traffic from a combined access and backhaul unit 10 to the network carrier's core infrastructure, in one embodiment the technique can also be used to handle transmission of downlink backhaul traffic from the network carrier's core infrastructure to the combined access and backhaul unit. In such embodiments, the network carrier's core infrastructure will include circuitry to perform the traffic disassembly operations 300 and the combined access and backhaul unit will include circuitry to perform the traffic reassembly operations 335.

However, for the purposes of the following description, the technique will be described in relation to the use of the disassembly/reassembly mechanism in connection with uplink backhaul traffic from a combined access and backhaul unit 10 to the network carrier's core infrastructure.

Figure 8:
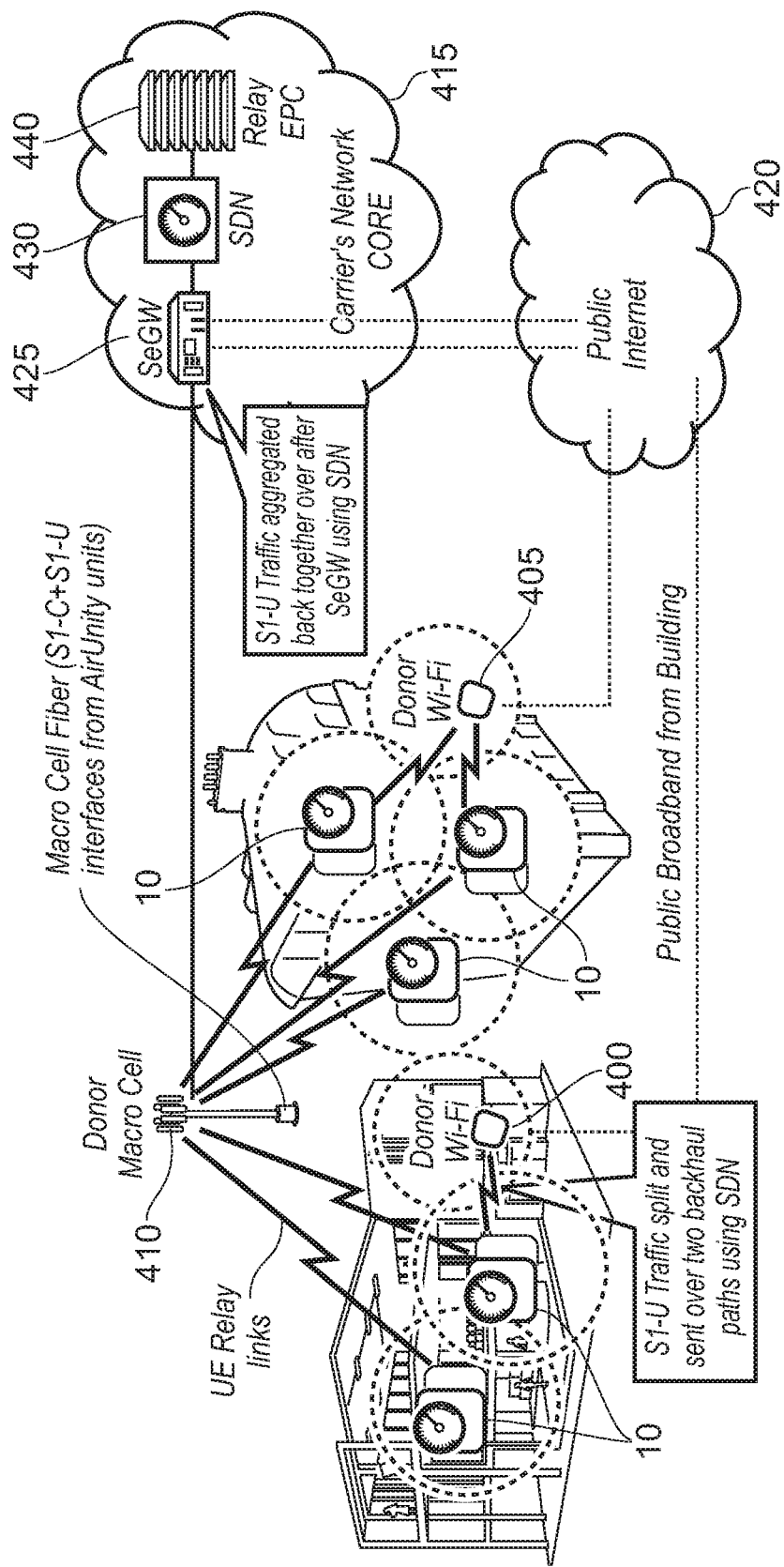
FIG. 8 schematically illustrates an example deployment where both wireless backhaul links and a public broadband connection are used for routing backhaul traffic to the network core in accordance with one embodiment.

FIG. 8 schematically illustrates a deployment incorporating the above described mechanism for uplink backhaul traffic. As shown, a number of combined access and backhaul units 10 may be deployed within buildings, and one or more of those may be able to connect into a donor Wi-Fi network 400, 405. For those units 10 that have access to the donor Wi-Fi, the above described backhaul management mechanisms can be used to allow both the wireless backhaul links (referred to in FIG. 8 as the "UE relay" links) to be used in combination with links routed via the public internet 420, in order to improve the overall capacity of the backhaul connection. The various packets of traffic routed via the two different mechanisms can then be aggregated back together within a gateway device 425 under the control of a unit 430, prior to the reconstructed backhaul stream being forwarded to the relay core 440 for onward propagation within the network.

There are a number of known mechanisms that can be used to implement the disassembly 300 and reassembly 335 operations. In one embodiment, software-defined networking (SDN) techniques are employed to allow flexible delivery of bandwidth "on demand", through the selective use of the broadband connection in addition to the main LTE wireless backhaul connection. In one particular embodiment, the disassembly and reassembly techniques can be constructed based on industry standard SDN OpenFlow technology. In other embodiments, Multi-link Point to Point (ML-PPP) Protocol techniques can be used to perform the disassembly 300 and reassembly 335 operations.

Returning to FIG. 7, the schematic illustration is intended to illustrate that the broadband connection 325 effectively provides a "fat pipe" for best effort, low value traffic, whilst mission critical traffic, like signalling, VoLTE, etc is routed via the LTE wireless backhaul link 330, which can be viewed to be a "strong pipe".

Figure 9:
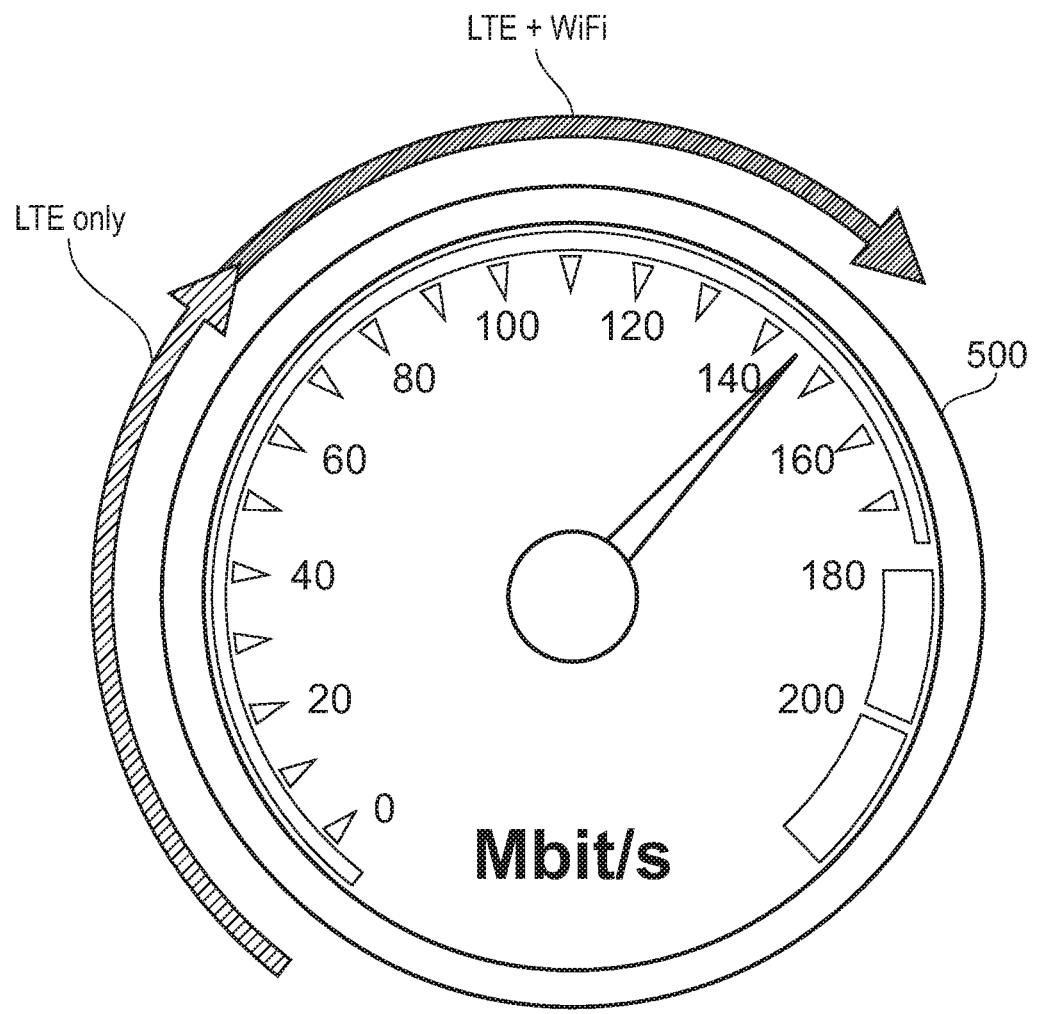
FIG. 9 schematically illustrates the performance improvements that may be used when employing the backhaul management techniques of the described embodiments.

FIG. 9 illustrates a bandwidth measuring device 500, in order to schematically illustrate the increase in overall bandwidth that can be achieved when the backhaul management circuitry is allowed not only to use the LTE backhaul connection, but also to seamlessly integrate that with the Wi-Fi connection so as to provide the enhanced bandwidth pipe 320 shown in FIG. 7.

The described techniques provide a number of benefits. With regard to the benefits experienced by end users, the described techniques enable the peak and average speeds to the device to be improved. As shown in FIG. 9, by using the LTE backhaul in combination with the Wi-Fi connection, this should always be faster than using only one of those mechanisms. The use of the device 10 is hence highly desirable to the end user, as they see a faster service than is available using either the Wi-Fi connection by itself, or the LTE link by itself.

Further, the quality of experience improves, since the backhaul management circuitry can work on a packet-by-packet basis, and combine the backhaul paths to provide the best case latency and service robustness. Wi-Fi coverage drops can be cured using the LTE backhaul mechanism. Further, LTE handover ensures service consistency across the deployment. In addition, the described mechanism can eliminate the bottlenecks that may otherwise arise when many users are fighting to use the same broadband connection, automatically providing load balancing across the multiple backhaul paths. Finally, from a user experience point of view, the approach simplifies the end user experience, as the user does not need to decide whether to switch on or off Wi-Fi. The LTE connection that the user makes to the combined access and backhaul unit will always be the better choice.

From the mobile carrier's point of views, there are also a number of benefits to be realised. In particular, the indoor relay experience improves with no additional "backhaul" cost to the carrier. The use of a Wi-Fi or wired internet connection offloads traffic from the donor macro network. Further, through the integrated use of the LTE backhaul and the Wi-Fi connection by the backhaul management circuitry to provide small cell backhaul capability, an LTE connection to the combined access and backhaul unit becomes the better choice for a user in all situations, since it intelligently combines the Wi-Fi and LTE broadband experiences together delivering the best of both worlds.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:
1. An apparatus comprising:
a first antenna system to provide a first sector of a network;
a second antenna system to provide a second sector of the network;

a third antenna system to communicate with a base station of the network to provide a common wireless backhaul connection between said base station and said apparatus;

an interface providing an additional backhaul connection between said base station and said apparatus via an internet connection of a building in which the apparatus is deployed; and backhaul management circuitry operable, in at least one mode of operation, to control utilisation of both the additional backhaul link connection and the common wireless backhaul connection to provide, in combination, backhaul connectivity between said base station and items of user equipment connected to the apparatus via the first and second antenna systems.

2. An apparatus as claimed in claim 1, wherein the interface is a WiFi interface.

3. An apparatus as claimed in claim 1, wherein the backhaul management circuitry comprises traffic type analysis circuitry to determine, for each block of backhaul traffic, a type of that traffic, and to select which one of the additional backhaul connection and the common wireless backhaul connection is used for propagation of that block of backhaul traffic dependent on the determined type of that traffic.

4. An apparatus as claimed in claim 3, wherein each block comprises a packet, such that the determination as to which of the additional backhaul connection and the common wireless backhaul connection to use is made on a packet-by-packet basis.

5. An apparatus as claimed in claim 3, wherein the backhaul management circuitry determines from the type of traffic whether the associated block of backhaul traffic is considered to be low importance or high importance, and is arranged to route backhaul traffic of low importance via the additional backhaul connection, and to route backhaul traffic of high importance via the common wireless backhaul connection.

6. An apparatus as claimed in claim 5, wherein backhaul traffic is considered to be of high importance if timing of delivery of that backhaul traffic is important.

7. An apparatus as claimed in claim 5, wherein:
the backhaul traffic comprises control traffic pertaining to control of the apparatus and user traffic pertaining to communications between the apparatus and connected items of user equipment; and
the backhaul management circuitry is arranged to treat control traffic as of high importance, and to selectively treat each block of user traffic as of high importance or low importance dependent on a type of that user traffic.

8. An apparatus as claimed in claim 3, wherein the backhaul management circuitry comprises traffic disassembly circuitry configured, in dependence on the type of traffic determined by the traffic type analysis circuitry, to disassemble a stream of backhaul traffic to be sent from the apparatus in order to form a first sub-stream to be sent via the common wireless backhaul connection and a second sub-stream to be sent via the additional backhaul connection.

9. An apparatus as claimed in claim 8, further comprising:
downlink traffic reassembly circuitry, responsive to a first downlink sub-stream received via the third antenna system and a second downlink sub-stream received via said interface to the additional backhaul connection, to aggregate together the first and second downlink sub-streams in order to form a stream of downlink backhaul traffic.

10. A network component for deploying in a network comprising at least one instance of an apparatus as claimed in claim 8, the network component comprising:
a first interface to receive the first sub-stream via a macro base station of the network;
a second interface to receive the second sub-stream via an internet connection; and
traffic reassembly circuitry configured to aggregate together the first and second sub-streams in order to form a stream of backhaul traffic for onward propagation within the network.

11. A network component as claimed in claim 10, further comprising downlink traffic disassembly circuitry to disassemble a stream of downlink backhaul traffic to be sent to the apparatus, in order to form a first downlink sub-stream to be sent to the apparatus via the common wireless backhaul connection and a second downlink sub-stream to be sent to the apparatus via the additional backhaul connection.

12. An apparatus as claimed in claim 1, wherein the third antenna system operates with a signal frequency different to the signal frequency employed by the first and second antenna systems.

13. An apparatus as claimed in claim 1, wherein the first and the second antenna systems are configured such that when the apparatus is deployed at a periphery of a building, the first sector extends into the building to provide enhanced availability of the network to items of user equipment within the building, and the second sector extends externally to the building to provide an additional source of network coverage to items of user equipment external to the building.

14. A method of operating an apparatus having first, second and third antenna systems to provide network coverage in a wireless network, comprising:
employing the first antenna system to provide a first sector of a network;
employing the second antenna system to provide a second sector of the network;
employing the third antenna system to communicate with a base station of the network to provide a common wireless backhaul connection between said base station and said apparatus;
providing an additional backhaul connection between said base station and said apparatus by connecting the apparatus to an internet connection of a building in which the apparatus is deployed; and
in at least one mode of operation, controlling combined utilisation of both the additional backhaul connection and the common wireless backhaul connection to provide backhaul connectivity between said base station and items of user equipment connected to the apparatus via the first and second antenna systems.

15. An apparatus comprising:
first antenna means for providing a first sector of a network;
second antenna means for providing a second sector of the network;
third antenna means for communicating with a base station of the network to provide a common wireless backhaul connection between said base station and said apparatus;
interface means for providing an additional backhaul connection between said base station and said apparatus via an internet connection of a building in which the apparatus is deployed; and
backhaul management means for controlling, in at least one mode of operation, combined utilisation of both the additional backhaul connection and the common wireless backhaul connection to provide backhaul connectivity between said base station and items of user equipment connected to the apparatus via the first and second antenna means.

* * * * *

UNITED STATES PATENT AND TRADEMARK OFFICE
CERTIFICATE OF CORRECTION

PATENT NO. : 10,721,669 B2
APPLICATION NO. : 15/499027
DATED : July 21, 2020
INVENTOR(S) : Paul Nicholas Senior Page 1 of 1

It is certified that error appears in the above-identified patent and that said Letters Patent is hereby corrected as shown below:

In the Claims

Claim 1, Column 17, Line 11, delete the word "link".

Signed and Sealed this
Seventeenth Day of November, 2020

Andrei Iancu
*Director of the United States Patent and Trademark Office*